May 17, 1932.  C. R. RANEY ET AL  1,859,219
HARVESTER THRESHER
Filed Oct. 27, 1927  4 Sheets-Sheet 2
Fig. 2.
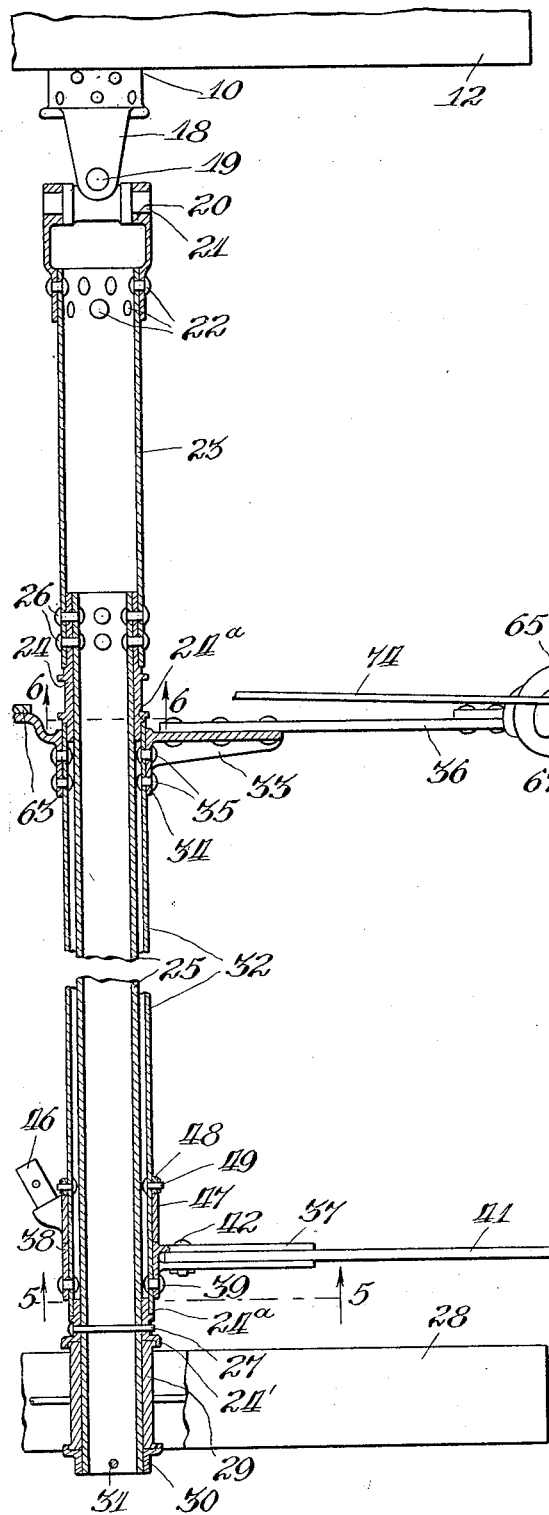
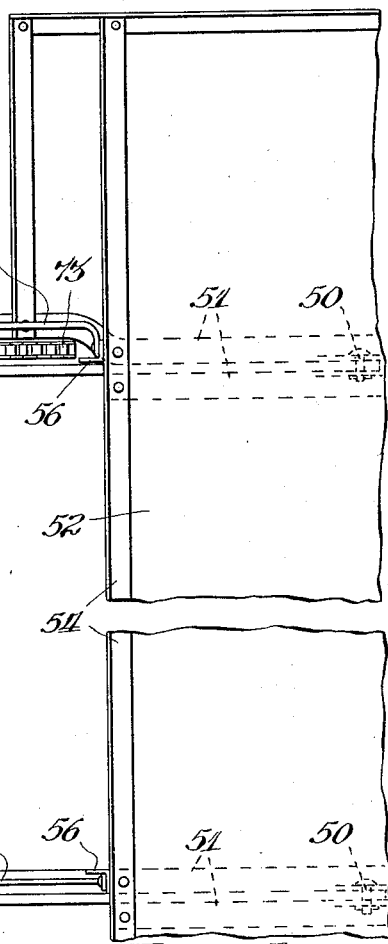
Inventors.
C. R. Raney
and L. P. Millard,
By
Atty.

May 17, 1932. C. R. RANEY ET AL 1,859,219
HARVESTER THRESHER
Filed Oct. 27, 1927   4 Sheets-Sheet 3

Inventors
C. R. Raney
and L. P. Millard
By their Attorney

May 17, 1932.  C. R. RANEY ET AL  1,859,219
HARVESTER THRESHER
Filed Oct. 27, 1927  4 Sheets-Sheet 4
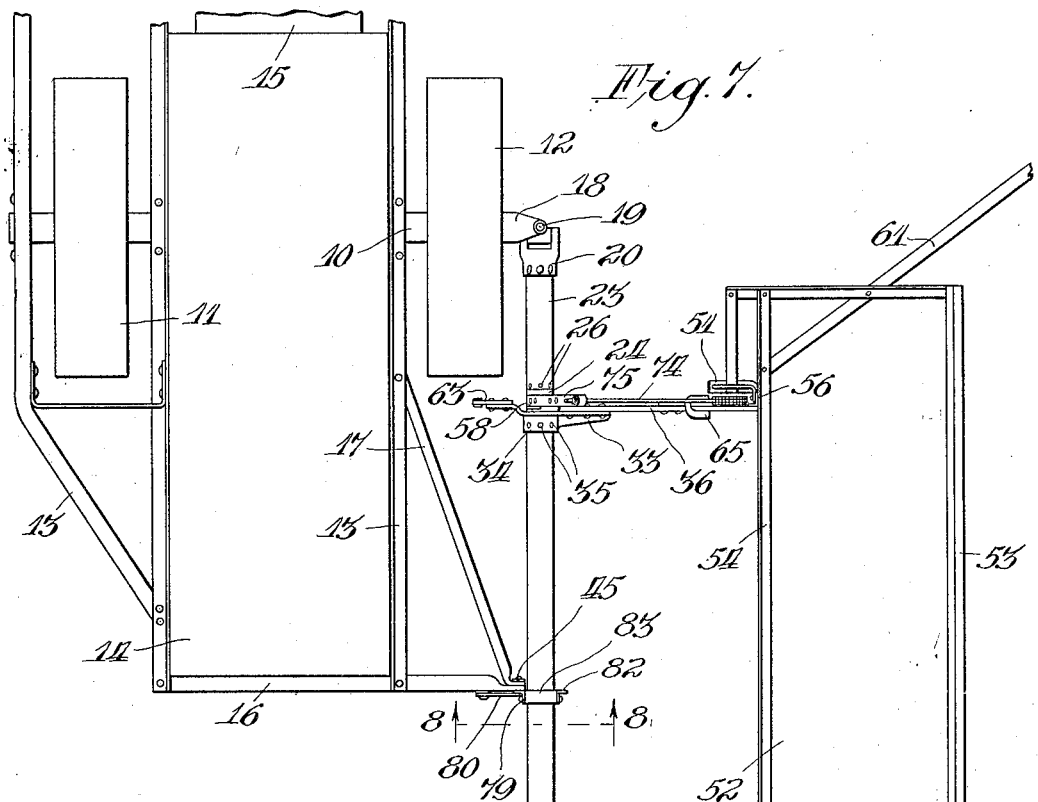
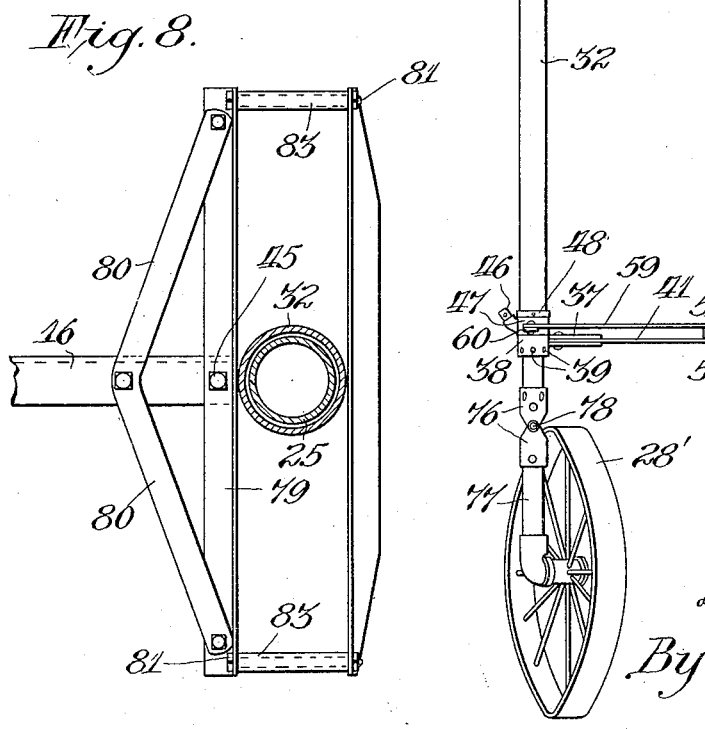
Inventors.
C. R. Raney
and L. P. Millard,
By their Atty.

Patented May 17, 1932

1,859,219

UNITED STATES PATENT OFFICE

CLEMMA R. RANEY, OF RIVERSIDE, AND LEE P. MILLARD, OF CHICAGO, ILLINOIS, ASSIGNORS TO INTERNATIONAL HARVESTER COMPANY, A CORPORATION OF NEW JERSEY

HARVESTER THRESHER

Application filed October 27, 1927. Serial No. 229,022.

The invention relates to harvester threshers. More particularly, the invention relates to an improved counter-balancing mechanism for facilitating the vertical adjustment of the harvester part of such a machine to alter the height of cut. The invention also relates to that type of harvester thresher in which the harvester part is arranged to fold from its normal transverse operating position to a rearwardly extending, longitudinal position alongside the thresher part, for the purpose of narrowing the width of the machine to facilitate its ready transport through narrow places and over narrow highways without the necessity of disconnecting the harvester part from the thresher part.

Thus, the primary object of the invention is to provide an improved construction and arrangement for effecting such counter-balancing of the harvester part. Another object is to do this in a machine of the folding type. Further, it is an object to accomplish this result independently of any offset or other weight, such as the weight of the thresher part.

Other objects of the invention will become apparent to those skilled in this art as the disclosure progresses.

Briefly, these desirable objects are accomplished in a harvester thresher having a wheel carried frame rigidly supporting a longitudinally disposed thresher part. Pivotally connected by connections to the thresher part is a transverse, non-rotatable harvester support carried at its free, or grainward, end by a wheel support. This non-rotatable support carries a turnable sleeve structure to which are connected the forwardly extending frame members which support the harvester part. A novel, compact, spring counter-balance mechanism is rigidly mounted on the non-rotatable support and serves to counter-balance pivotal up and down movements of the harvester part, or header platform. The sleeve structure mentioned turns about the non-rotatable support when such pivotal movement of the platform takes place. The connections of this non-rotatable harvester support to the thresher part permit rearward folding of the support and, with it, the harvester part, to a position alongside the thresher part to narrow the width of the harvester thresher. In its normal cutting position the harvester part is also permitted to float by means of the connections mentioned, to cause the harvester part to conform with ground slopes.

In the accompanying sheets of drawings showing an illustrative embodiment of the invention,—

Figure 2 is an enlarged, detail, plan view, showing the harvester part and the manner of its connection to the thresher part, the harvester support being shown in transverse section to illustrate its details;

Figure 6 is a vertical, cross view, partly in section, as seen along the line 6—6 of Figure 2, when viewed in the direction of the arrows, showing a detail of the counter-balance;

Figure 7 is a general plan view of the harvester thresher showing the harvester part in its rearward folded position; and Figure 8 is a detail view of the guide for the harvester support, which is used when the support is folded, as seen along the line 8—8 of Figure 7, looking in the direction of the arrows.

Figure 1:
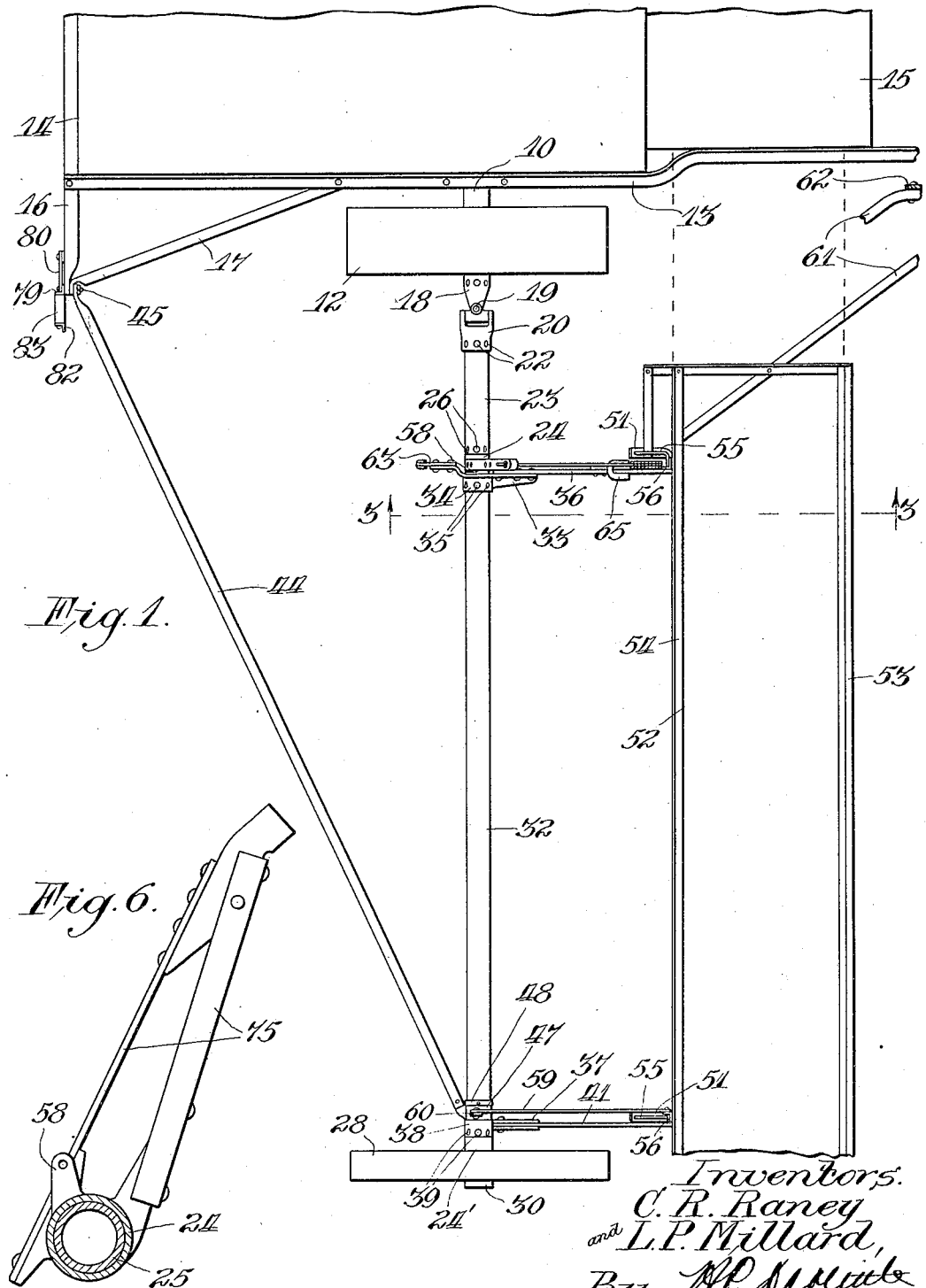
Figure 1 is a general plan view of so much of a harvester thresher as is requisite to illustrate this invention.

The machine generally comprehends, as has been stated, a harvester or header for cutting and gathering standing grain and delivering the same to a thresher to be threshed and separated, these parts being so combined as to travel together and cooperate in harvesting and threshing crops in a manner well understood in this art.

In the drawings, the harvester thresher is shown having a stationary, transverse axle part 10 carrying a main wheel 11 and an intermediate wheel 12. This axle part, which constitutes the main axle of the machine, rigidly carries in any approved manner, the longitudinally disposed main frame 13, on which is mounted the thresher part comprising a thresher housing 14 and a feeder housing 15 in front thereof. In advance of the feeder housing 15, the main frame 13 is conventionally carried on a pilot wheel truck (not shown) for steering the machine. The rear end of the main frame 13 includes a transverse, grainwardly extended frame bar 16, braced by a diagonal brace 17 to a forward point on the main frame. The purpose of this extended bar 16 will later be made clear. As the parts so far described are standard in the art, it is thought enough of the thresher part has been disclosed to make an understanding of the same clear. The harvester part will next be described.

Connected rigidly to the thresher part, and preferably to an end of the thresher axle projected grainwardly of the intermediate wheel 12, is a bracket 18 carrying a vertical hinge pin 19 to which pin, in turn, is turnably connected a second bracket 20 including a horizontally disposed hinge pin 21. This structure constitutes, in a sense, separate connections for a purpose later to appear. Securely fastened by rivets 22 in the bracket portion 20, as best shown in Figure 2, is a transversely and grainwardly extending pipe extension 23, of relatively short length. At its end, the extension 23 has telescoped thereinto a bearing sleeve 24, and inside said sleeve is telescopically fitted a harvester support pipe 25 extending transversely and grainwardly a substantial distance. The extension 23, sleeve 24, and support 25 are all rigidly secured together by means of rivets 26. Adjacent its grainward end the support 25 has securely fastened thereto, by means of a bolt 27, a bearing sleeve 24'. A grain wheel 28 is here mounted on said harvester support pipe 25 by means of a hub 29. A dust cap 30 secured by a bolt 31 to the support 25 retains the grain wheel in place. In this fashion the outer end of a non-rotatable support 25 is wheel carried.

It is to be noted, as best shown in Figure 2, that each of the bearing sleeves 24 and 24' includes an annular stop shoulder 24ª, and that each of these bearing sleeves includes an extended portion, which portions on the respective sleeves extend toward each other a short distance. These short extensions form bearings for the turnable mounting of a long sleeve or torque tube member 32 surrounding the support 25 and extending preferably the entire distance therealong between the two annular shoulders 24ª, which serve as stops to prevent endwise movement of the long sleeve member 32, as will be understood.

Figure 5:
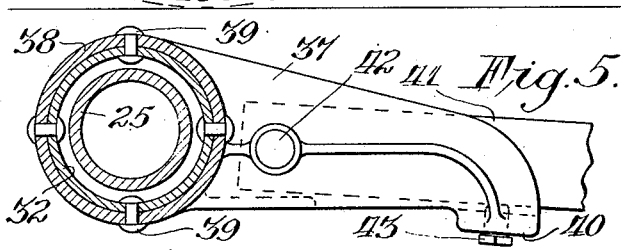
Figure 5 is a detail side view, showing the connection of a platform supporting bar to the harvester support, as seen along the line 5—5 of Figure 2, looking in the direction of the arrows.

The sleeve member 32, at one end adjacent its bearing 24, carries a fore and aft extending bracket 33, (see also Figure 3), which bracket includes a collar portion 34 surrounding said sleeve member 32. The collar 34 is rigidly connected to the sleeve 32 by rivets 35. At its front end the bracket 33 has securely bolted thereto a forwardly extending line bar 36 which at its forward end is slightly bent up angularly. At its other end, the sleeve or pipe 32 carries another forwardly extending bracket 37, which bracket also includes a collar 38 surrounding and made fast to the pipe 32 by means of rivets 39 adjacent the bearing 24', (see also Figure 5). This bracket 37 includes an offset plate 40 upon which loosely rests another forwardly extending line bar 41, said bar 41 being pivotally connected to a pin 42 journaled in the bracket 37, as shown. A set screw 43 is carried in the plate portion 40 and serves as a conventional means for adjusting the line bar up or down in a manner well understood in this art. It must now be clear that the line bars 36 and 41 are connected to the sleeve member 32 in such a manner that they must swing up or down upon a rotating movement of said member 32. The supporting pipe structure described is held transversely out in this normal position by means of a diagonal brace member 44 detachably connected at its rear end by a bolt 45 to the grainward end of the projected thresher part frame bar 16, heretofore described, (see Figure 1). At its front end, the brace 44 is detachably connected to a part 46 formed as a part of a collared bracket 47 loosely surrounding the sleeve member 32 next to the collar 38. A stop collar 48 is connected by rivets 49 to the sleeve member 32 to hold the loose collar bracket 47 in place.

At their front ends, the line bars 36 and 41 are each pivotally connected at 50 on transversely alined pivots between a pair of angle platform bars 51, (see Figures 2 and 3), which bars 51 carry the usual harvester platform 52 provided at its front side with a transverse Z-bar 53 and at its back side, with a transverse angle bar 54, the bars 53 and 54 being mounted on the platform bars 51. At each end of the platform 52, one of the bars 51 is projected back to serve as an anchor for braces 55 connected to upright angle bars 56 mounted on the transverse angle bar 54. These uprights 56 constitute the framework for supporting a conventional form of backboard, not shown, to protect the platform 52 from the wind. The upright 56 adjacent the line bar 36 is further strengthened by a back brace 57 connected to an ear 58 on the stationary bearing sleeve 24, (see Figures 1 and 3), and the upright 56 adjacent the line bar 41 is further strengthened by a back brace 59 connected to an ear 60 on the part 47.

Underneath the stubbleward end of the platform 52 is a diagonal bar 61 connected to a conventional lift link structure, indicated at 62, and suitably made accessible to an operator's station on the thresher part, (not shown), whereby in a manner well known in this art, the operator may cause the platform to be adjusted up or down in accordance with the height of grain encountered, to adjust the height of cut. As the platform 52 is so adjusted, the line bars 36 and 41 cause the sleeve 32 to rotate on its bearings, as will be understood, while the main support pipe 25 remains non-rotatable. Due to the great weight and cumbersomeness of the platform, or harvester part, means must be provided to counter-balance this weight and assist the operator in making these manual adjustments. Such counterbalancing mechanism will next be described.

Figure 3:
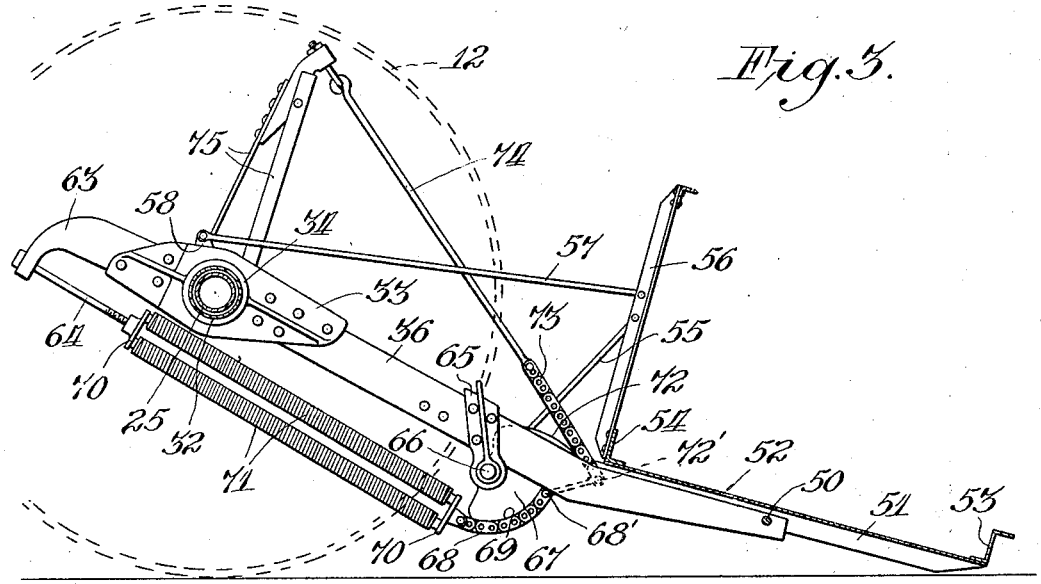
Figure 3 is a detail, side elevational view, showing the improved counter-balancing mechanism for the harvester platform, as seen along the line 3—3 of Figure 1, looking in the direction of the arrows. The platform is here shown in its extreme down position.
Figure 4:
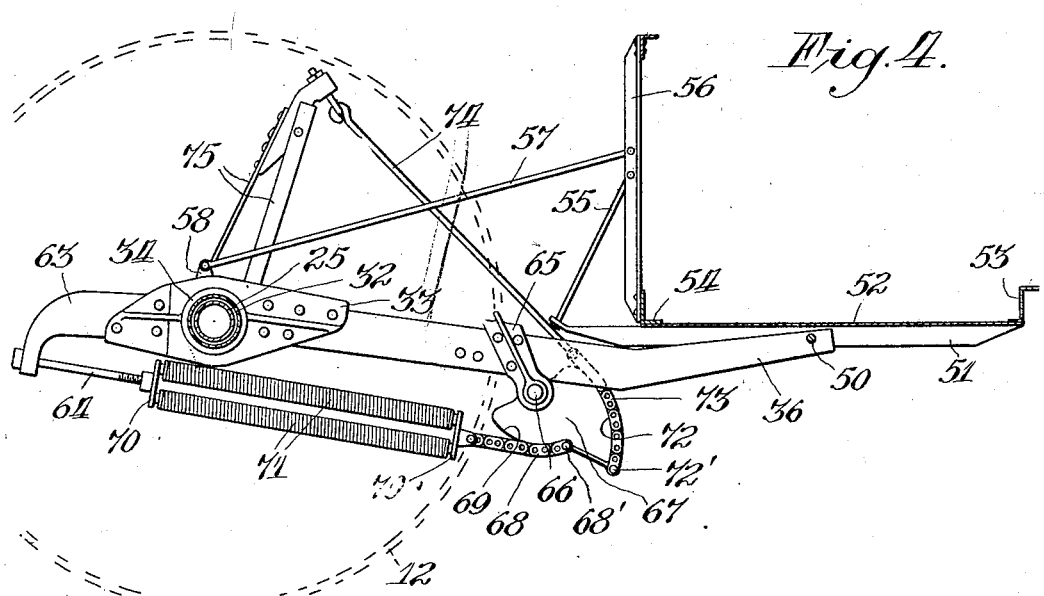
Figure 4 is another view along the line 3—3 of Figure 1, as in Figure 3, but showing the platform in its extreme up position.

The line, or platform supporting, bar 36 has an aft portion 63 bent downwardly, which receives a bolt 64, as shown. At a forward point along its length, the bar 36 rigidly carries a bracket 65 provided with a pin 66 which pivotally carries a depending compensating member 67 having a short flexible element, such as a chain 68, connected thereto at 68', which chain operates over a substantially concentric cam portion 69. The chain and the bolt 64 each carries a head 70. Between these heads 70 is a battery of tensioned springs 71. The forward side of the member 67 is formed with an eccentric cam surface 72 and at its lower end, at 72', is connected another flexible element 73, also preferably a chain, which is trained back over the surface 72, as shown, (see Figures 3 and 4). The rear, free end of this chain 73 is connected to a link 74 pivotally connected at its rear end to the top of an upright, fixed, post structure 75 securely bolted to the stationary bearing sleeve 24 on the non-rotatable pipe support 25, (see Figure 6). The rock member 67 is a compensating device, the purpose of which is to maintain the pull of the springs 71 substantially uniform in any up or down position of the platform. As shown in Figure 3, the springs are under their greatest tension when the platform is in its extreme down position. This is explained by the fact that the link 74 is the pull link and it is anchored at a fixed point on the top of the post 75. Thus, as the platform is lowered, the pin 66 is also lowered, which causes the compensator 67 to rock forwardly and, in doing this, it stretches the springs 71. Now, when it is desired to lift the platform, the greatest possible purchase is necessary to overcome the pull of these springs. This greater purchase automatically comes into play through the action of the long eccentric part 72, which serves to increase the leverage and pull on the springs as the platform goes up, which also causes the pin 66 to go up and rock the compensator 67 rearwardly, (see Figure 4). Thus, automatically, the compensator is caused to maintain the pull of the springs substantially uniform.

At times it is necessary to narrow the width of the harvester thresher to permit its ready transport over narrow roads, through gates, or for storage purposes. This is accomplished by folding the harvester support 23, 25 back on its vertical hinge connection 19 to the position shown in Figure 7. Of course, it is first necessary to detach the brace 44, as will be understood. Another prerequisite is to remove the grain wheel 28 and substitute therefor a castering wheel 28'. To do this, the dust cap 30 is removed by taking out the pin 31. The wheel 28 can then be slid off the pipe 25. A hinge part 76 is then made fast on said pipe 25, as shown in Figure 7, which hinge part also is connected to a wheel support 77, which carries the substitute wheel 28'. The part 76 includes a vertical pin 78 whereby free pivoting of the wheel 28' for trailing and castering is permitted.

When the pipe structure 23, 25 is swung back to the position of Figure 7, means must be provided for so retaining this structure. Accordingly, the transverse frame bar 16 carries an upright angle bar 79 braced by braces 80. At its top and bottom, this bar 79 carries transverse bolts 81 for carrying another laterally spaced, upright angle bar 82. Collars 83 cover the bolts 81 and serve as spacers. The bar 82 can be pivoted upwardly upon removal of the lower bolt 81 to permit entry of the pipe structure, as best shown in Figure 8. The bar 82 is then brought back and secured in its normal position. There is thus provided a guide and locking structure which retains the pipe structure 23, 25 in its trailing, folded position, and also permits limited floating movement thereof about the horizontal hinge part 21 for the purpose of conformance with ground irregularities.

When operating the harvester thresher, the cutting and conveying mechanisms of the harvester will be actuated by mechanisms connected to the thresher, the thresher and elements thereof being driven from an engine. These parts are common in the art and, as they form no part of this invention, they have not been shown. The machine as a whole is drawn through the field of grain by a tractor or by animal power, and the motor on the main frame is set in operation to actuate the thresher and harvester, to produce the usual coaction between these parts. As the machine moves along, it is necessary for the operator to actuate the lift link 62 to raise or lower the platform 52 to adjust the height of cut. Let us assume that the platform is to be lowered from the position of Figure 4 to the position of Figure 3. As the platform is dropped, the line bars 36, 41 move down also with a rocking or turning movement imparted by the rotatable sleeve member 32, which rotates without turning the main support 25, as has been said. The support 25 and its extension 23 do not rotate and, in effect, constitute a dead axle. This movement of the platform is counter-balanced by the springs 71 described, which include the compensator 67 for maintaining the pull of the springs substantially uniform, as described. It can now be seen that the harvester platform is adjusted independently of the thresher part, which is at all times rigidly carried on the main frame in a fixed position. Also the counter-balance mechanism is carried entirely on the harvester part and has no connection whatsoever with the thresher side of the machine. Further, this counter-balance folds with the harvester and need not be disconnected therefrom for this purpose. Another feature of the structure is the compactness of the counter-balancing arrangement in which the springs and compensator are snugly located beneath a platform line bar. The support structure 23, 25 can freely float up and down on the connecter 21 to conform with ground irregularities.

When folding the harvester part and its support structure 23, 25, the wheel 28' is substituted for the grain wheel 28; the brace 44 is removed and laid aside; the forward stubbleward end of the platform is disconnected from the feeder housing 15 of the thresher part; and the pipe structure 23, 25 can then be pivoted back on the connecter 19 to the position in Figure 7, where the guide structure of Figure 8 retains the same in its folded position, in the manner described. It is to be noted that the counter-balancing mechanism does not require any change or attention in this folding action. In the preferred embodiment of the invention the thresher axle 10 is stationary, and the harvester axle or support structure will be connected thereto by the hinge connections described, in coaxial alignment. Thus, the axle part 10 and parts 23 and 25 form a coaxially alined non-rotatable axle structure for carrying the thresher and harvester.

It is to be understood that only the preferred embodiment of the invention has been shown and described and that the same is obviously capable of changes and modifications without departing from the spirit and scope of this invention. It is the intention to cover all such changes as is indicated in the subjoined claims.

What is claimed as new is:

1. In a combined harvester thresher, a thresher part, a harvester part, a non-rotatable axle, and a torque tube rotatably surrounding the axle for mounting the harvester part on said axle.

2. In a machine of the class described, a thresher, a harvester, a non-rotatable axle, the thresher rigidly carried thereon, and a torque tube rotatably surrounding the axle for supporting the harvester.

3. In a machine of the class described, a thresher, a harvester, supporting wheels for said thresher, a grain wheel for said harvester, a non-rotatable axle carried in said wheels, and a torque tube rotatable around the axle and supporting the harvester, whereby the harvester may be adjusted about said non-rotatable axle.

4. In a machine of the class described, a thresher, a harvester, supporting wheels for said thresher, a flexibly jointed non-rotatable axle connecting said elements whereby the harvester may float up or down to follow ground irregularities, and a torque tube rotatably surrounding the axle for mounting the harvester on the axle to permit adjustment for varying the height of cut of the harvester.

5. In a machine of the class described, a thresher having a carrying wheel, a harvester having a grain wheel, a non-rotatable axle embodying a connection connecting said wheels, and a torque tube rotatably surrounding the axle for supporting the harvester for up and down movement.

6. In a machine of the class described, a thresher, a harvester, a dead axle provided with a rotatable torque sleeve surrounding the same for rockingly supporting the harvester in offset relation relative to the thresher, the axle connected to the thresher for folding movement, and means for rocking said tube to adjust the height of cut of the harvester.

7. In a machine of the class described, a thresher, a harvester arranged in lateral relation thereto, a non-rotatable axle including a rotatable torque tube surrounding the same for rockingly supporting the harvester in offset relation, and means connecting said axle and thresher for permitting said axle to float up or down and to swing rearwardly for folding.

8. In a machine of the class described, a thresher, an axle section therefor, a harvester, a non-rotatable axle section for the harvester, means for hingedly connecting said axle sections for folding, and a rotatable torque tube surrounding the axle for rockingly connecting the horvester to its axle section to permit raising or lowering of said harvester.

9. In a combined harvester thresher, supporting wheels for said thresher, a grain wheel for said harvester, a non-rotatable axle carried in said wheels, a turnable torque sleeve surrounding said axle, brackets rigidly connected to turn with the sleeve, and line bars pivotally carried by the brackets for carrying the harvester on said sleeve.

10. In a combined harvester thresher, a thresher part, a harvester part, a non-rotatable axle, a turnable torque tube surrounding the axle for mounting the harvester part on said axle, and means hingedly connecting the axle to the thresher part to permit floating and folding thereof.

11. In a combined harvester thresher, a thresher part, a harvester part, a support hingedly connected to the thresher part to permit floating and folding movement of the support, a turnable torque tube rotatably surrounding the support for connecting the harvester part on the support to permit vertical adjustment of the harvester part, and permanently mounted means included in the harvester part for counter-balancing the weight of the same.

12. In a combined harvester thresher, a thresher part, a harvester part, a non-rotatable axle for the parts, said axle carrying a rotatable torque tube surrounding the same for mounting the harvester to permit up and down adjustment of the harvester, means for so adjusting the harvester, and a tension counterbalanced for the harvester included in the harvester part.

13. In a combined harvester thresher, a thresher part, a harvester part including a platform, a non-rotatable support hingedly connected to the thresher part, a rotatable torque tube surrounding the support for mounting the harvester platform for up and down movement to vary the height of cut, and means for counter-balancing the movements of the harvester platform.

14. In a combined harvester thresher, a thresher part, a harvester part including a platform, a non-rotatable support hingedly connected to the thresher part for floating and folding movement, a rockable torque tube surrounding the support for mounting the harvester platform for up and down movement to vary the height of cut, and a spring counter-balance on the support connected to counter-balance the up and down movements of the harvester platform, said counter-balance folding with the support.

15. In a combined harvester thresher, a thresher part, a harvester part including a platform, a non-rotatable support hingedly connected to the thresher part, a rotatable sleeve structure surrounding the support, line bars mounted on the sleeve structure, the line bars carrying the harvester platform, and a counter-balance on the support connected to one of the line bars for counter-balancing movement of the harvester platform.

16. In a combined harvester thresher, a thresher part, a harvester part including a platform, a non-rotatable support hingedly connected to the thresher part, rotatable means on the support, line bars mounted on the rotatable means, said harvester platform being carried on the line bars, and a counter-balance on the support connected to one of the line bars and located beneath said line bar.

17. In a combined harvester thresher, a thresher part, a harvester part, a non-rotatable axle, and a rotatable torque tube turnable independently of said axle but about its axis for mounting the harvester part on said axle.

18. In a combined harvester thresher, a thresher part, a harvester platform, a transverse axle, longitudinal line bars for connecting the harvester platform to the axle, and a counterbalance spring for the platform connected to and arranged longitudinally below one of the line bars.

19. In a combined harvester thresher, a thresher part, a harvester platform, an axle, line bars for connecting the harvester platform to the axle for up and down movement, a spring tension counterbalance for the platform arranged beneath one of the line bars, and means to keep the spring tension uniform in all up and down positions of the platform.

In testimony whereof we affix our signatures.

CLEMMA R. RANEY.
LEE P. MILLARD.